United States Patent Office
3,004,996
Patented Oct. 17, 1961

3,004,996
PHOSPHORUS AND SULFUR CONTAINING COMPOSITIONS AND METHOD FOR PREPARING SAME
Arthur N. Arakelian, Cleveland, and Alan Rhodes, Willoughby, Ohio, and Thomas Robert Hopkins, Joplin, Mo., assignors to The Lubrizol Corporation, Wickliffe, Ohio, a corporation of Ohio
No Drawing. Filed Apr. 9, 1956, Ser. No. 576,756
12 Claims. (Cl. 260—429.9)

This invention relates as indicated to certain phosphorus and sulfur-containing compositions and to a process for the preparation thereof. In a more particular consideration, the invention relates to reaction products obtained from metal salts of organic phosphorus thioic acids.

This application is a continuation-in-part of copending application Serial No. 484,557, filed January 27, 1955, and now abandoned.

It is a principal object of the present invention to provide new compositions of matter.

It is also an object of the present invention to provide a novel process for the preparation of the above compositions of matter.

These and other objects are accomplished by a process which comprises the reaction of a metal salt of a phosphorus thioic acid having the structure

where A and B are the same or different radicals selected from the class consisting of RO, RS, HS, HO and R, at least one of A and B being an organic radical, and X is oxygen or sulfur, with at least an approximately equivalent amount of an organic epoxide or thioepoxide.

The organic radicals in the above structure are preferably non-functional, which is to say that they do not take part in or have any significant influence upon the reaction of the process. Such organic radicals A and B, may in a preferred instance be selected from the radicals R and R′, RS and R′S, or RO and R′O. Thus the phosphorus thioic acid may be either of the following:

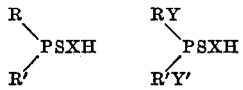

where R and R′ are the same or different organic radicals, each bound to the rest of the molecule through a carbon atom and X, Y and Y′ are the same or different and are selected from the class consisting of oxygen and sulfur. R and R′ may be aliphatic, cycloaliphatic, or aromatic, and may contain organic or inorganic substituents. Illustrative types of organic radicals include alkyl, cycloalkyl, aryl, aralkyl, alkaryl, alkenyl, cycloalkenyl, etc. and the substituted derivatives of these; e.g., nitro-, halo-, alkoxy-, hydroxy-, carboxy-, etc. Thus suitable organic radicals would include; e.g., methyl, ethyl, n-propyl, isopropyl, n-butyl, isobutyl, amyl, isoamyl, n-hexyl, 4-methyl-2-pentyl, cyclohexyl, chloro-cyclohexyl, methyl-cyclohexyl, heptyl, n-octyl, tert-octyl, nonyl, lauryl, cetyl, phenyl, bromophenyl, nitro-phenyl, methoxy-phenyl, ethyl-phenyl, propyl-phenyl, butyl-phenyl, amyl-phenyl, benzyl, phenethyl, allyl, octenyl, cyclohexenyl, etc.

The above illustrated structures, it will be seen, include the phosphinothioic acids and phosphorothioic acids, and the metal salts of these acids comprise the preferred starting materials of the hereindescribed process. Of these the di-thioic acid salts are especially preferred.

The phosphinodithioic acids may be prepared most conveniently by the process described in copending application, Serial No. 406,323 filed January 26, 1954, now U.S. 2,797,238. This process comprises the reaction of an aromatic compound with phosphorus pentasulfide in the presence of an aluminum halide. Other means of preparing phosphinodithioic acids involve either the reaction of a Grignard reagent with phosphorus pentasulfide or sulfurization of a secondary phosphine.

The phosphorodithioic acids may be prepared by the reaction of phosphorus pentasulfide with the hydroxy compound which corresponds to the organic radicals R and R′. This reaction is illustrated by the action of phosphorus pentasulfide on ethyl alcohol to produce O,O-diethyl phosphorodithioic acid.

Metal salts of the above phosphorus dithioic acids may be prepared quite conveniently by treating the particular acid with a metal oxide or hydroxide. Thus, the calcium salt of a phosphinodithioic acid may be prepared from the acid by reaction with calcium oxide.

The organic epoxides and thioepoxides may be represented as having the structural grouping

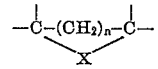

where X is oxygen or sulfur and $n$ is 0 or 1. Those epoxides and thioepoxides are preferred in which one of the carbon atoms attached to X is attached also to two hydrogen atoms. In other words, the preferred compounds are terminal epoxides and thioepoxides and have the structural grouping

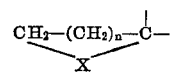

where $n$ is 0 or 1. These have been given the name terminal epoxides and thioepoxides because they may be thought of as being derived in most instances from a vinyl compound or one which has a terminal olefinic double bond.

Specific examples of suitable epoxides include ethylene oxide, propylene oxide, epichlorohydrin, 1-butene oxide, butadiene monoxide, 1-amylene oxide, styrene oxide, trimethylene oxide, 9,10-epoxystearic acid, etc.

As noted previously, the process of the invention contemplates the use either of epoxides or thioepoxides. As a matter of convenience, the term epoxide is used hereinafter in a broad sense to indicate both the epoxides and thioepoxides.

The reaction of organic epoxides with metal salts of phosphorus dithioic acids is in some cases an exothermic reaction which may be carried out conveniently within the temperature range of 0–200° C. In those cases in which the reaction is exothermic, the exothermic nature of the reaction usually is such that the temperature of the reaction can be controlled within this range without the application of any external heating, by adding the organic epoxide portion wise to the salt of the phosphorus dithioic acid. Although it is not necessary, it is preferred to control the temperature so that it is reasonably constant throughout the course of the reaction. It is particularly preferred to control the temperature within the range of 50–100° C.

The reaction may be carried out in the presence or absence of a mutual solvent for the organic epoxide and the metal salt of the phosphorus dithioic acid. If a solvent is used, it should be one which is inert towards both reactants such as, e.g., petroleum ether, kerosene, light and heavy mineral oils, benzene, toluene, xylene, ortho-dichlorobenzene, carbon tetrachloride, etc. Since metal salts of phosphorus dithioic acids are often prepared as solutions in such inert solvents, these solutions may be conveniently used for reaction with the organic epoxide.

Neither the mechanism by which the reaction proceeds nor the identity of the products which are formed thereby are known or understood. It appears that the reaction involves the addition of a molecule of an epoxide to a molecule of phosphorus thioic acid salt rather than a condensation of the two molecules. Something more than a mere addition reaction must take place, however, since it appears that the product is not a metal salt. This is borne out by a comparison of some of its reactions with similar reactions of the corresponding metal phosphorus thioate from which it is prepared. Thus the organic portion of the metal salt which is the starting material is not affected by treatment with alcoholic hydrochloric acid, whereas in the case of its epoxide reaction product the organic portion thereof is rather completely decomposed by such treatment. In this case it is evident that some molecular rearrangement is involved in addition to the addition of the two specified reactants. In any case the exact molecular structure of the product is not known and for this reason the product must be described in terms of the process by which it may be prepared.

It appears that the reaction involves equivalent amounts of salt and epoxide; e.g., one equivalent amount of the metal salt of the phosphorus dithioic acid reacts with one equivalent amount of a terminal organic epoxide. The use of an excessive amount of the epoxide, however, does not seem to have an adverse effect upon the reaction, and accordingly the scope of the invention contemplates the use of excessive amounts of epoxide. Preferably, however, equivalent amounts are used.

A wide variety of metal salts may be used, including both monovalent and polyvalent metal salts. The metal salts include the following: sodium, lithium, potassium, calcium, barium, strontium, magnesium, aluminum, lead, cadmium, zinc, etc. The polyvalent metals are preferred because of the greater stability of the products obtained therefrom; and zinc is especially preferred.

It should be noted that the product of the reaction fo the hereindescribed process is characterized by retention of the metal in its composition. Thus, for example, the reaction product of a zinc salt of a phosphorodithioic acid and propylene oxide is characterized by the fact that it contains zinc. The zinc (or other metal, as the particular case may be) is present in the product in a relatively stable form; it cannot be washed out by aqueous washings.

Other details of the process of invention are illustrated by the following examples:

*Example 1*

To 1935 grams (5 equivalents) of an 86% solution of zinc di(4-methyl-2-pentyl) phosphorodithioate in mineral oil there was added portionwise at 65° C. 348 grams (6 equivalents) of propylene oxide over a period of four hours. The temperature was maintained at 75–85° C. throughout this period. The resulting mixture was concentrated by heating to a final temperature of 75° C./15 mm. The amber liquid residue showed the following analyses:

Percent phosphorus _____ 6.6
Percent sulfur _____ 14.0
Percent zinc _____ 7.5

*Example 2*

To 760 grams (2.0 equivalents) of an 86% solution of zinc di(methyl-2-pentyl)phosphorodithioate in mineral oil was added at 50° C. 185 grams (2.0 equivalents) of epichlorohydrin. The epichlorohydrin was added portionwise from a dropping funnel and after the addition was complete, the mixture was stirred at 80–90° C. for an additional two hours. Concentration of the reaction mixture yielded a light brown liquid residue which showed the following analyses:

Percent phosphorus _____ 6.8
Percent sulfur _____ 14.5
Percent zinc _____ 7.5

*Example 3*

A solution of 246 grams (1.0 equivalent) of zinc diisopropyl phosphorodithioate in 200 grams of benzene was heated to 60° C., whereupon 48 grams (1.1 equivalents) of ethylene oxide was added slowly so as to maintain the temperature at about 70–80° C. The reaction mixture was heated at this temperature for an additional three hours and then concentrated to a light, viscous residue by distillation under reduced pressure. This residue showed the following analyses:

Percent phosphorus _____ 10.5
Percent sulfur _____ 21.9
Percent zinc _____ 11.2

*Example 4*

Five hundred grams (1.74 equivalents) of zinc dibutyl phosphorodithioate was heated to 65° C. and then treated portionwise with 101 grams (1.74 equivalents) of propylene oxide. The addition of propylene oxide was sufficient in itself to maintain the reaction temperature at 85–90° C. Immediately after all the propylene oxide was added, the mixture was concentrated by heating to a final temperature of 80° C./40 mm. The residue showed the following analyses:

Percent phosphorus _____ 8.8
Percent sulfur _____ 19.3
Percent zinc _____ 10.0

*Example 5*

To 1164 grams (3.0 equivalents) of a 77% solution in mineral oil of a mixture of the zinc salts of di(4-methyl-2-pentyl)phosphorodithioic acid and di-isopropyl phosphorodithioic acid there was added at 80° C. 174 grams (3.0 equivalents) of propylene oxide. The material was added portionwise from a dropping funnel over a period of three hours and the resulting product was heated to a final temperature of 80° C./30 mm. within a period of 75 minutes. As no distillate was collected, an additional 42 grams (0.7 equivalent) of propylene oxide was added over a period of 45 minutes. This second addition of propylene oxide elicited a still further exothermic reaction. This product likewise was heated to a final temperature of 80° C./25 mm. to produce a slight viscous, ligh brown residue which showed the following analyses:

Percent phosphorus _____ 6.9
Percent sulfur _____ 14.5
Percent zinc _____ 7.4

*Example 6*

To 670 grams (1.0 equivalent) of a 72.5% solution of lead di(2-ethylhexyl) phosphorodithioate in mineral oil at 60° C. there was introduced beneath the surface 58 grams (1.0 equivalent) of propylene oxide. The addition was made over a period of two hours and the temperature maintained at 75–80° C. throughout the period. The resulting mixture was stirred at 75° C. for an additional hour. The reaction was marked by a series of striking color changes from green-brown through a deep green, thence a deep red, and finally to a dark brown. The mixture was filtered and the filtrate shown to have the following analyses:

Percent phosphorus _____ 4.2
Percent sulfur _____ 8.8
Percent lead _____ 12.9

*Example 7*

A sample of molybdenum di(4-methyl-2-pentyl) phosphorodithioate weighing 180 grams (0.5 equivalent) was treated at room temperature portionwise with 29 grams (0.5 equivalent) of propylene oxide. The addition of propylene oxide required one hour and caused an overall rise in temperature to 60° C. The mixture was heated for an additional hour at 70° C. and then concentrated by heating to 70° C./25 mm. The residue showed the following analyses:

Percent phosphorus _____ 7.4
Percent sulfur _____ 20.0
Percent molybdenum _____ 7.1

*Example 8*

To 380 grams (1.0 equivalent) of an 86% solution of zinc di(4-methyl-2-pentyl) phosphorodithioate in mineral oil at 60° C. there was added 74 grams (1.0 equivalent) of propylene sulfide. The reaction was considerably exothermic and the temperature was maintained by stirring at 70–80° C. for an additional hour after all of the propylene sulfide had been added. The resulting mixture was filtered through a filter aid and the filtrate showed the following analyses:

Percent phosphorus _____ 7.0
Percent sulfur _____ 21.6
Percent zinc _____ 7.4

*Example 9*

To 388 grams (1.0 equivalent) of a 95% solution of cadmium di(4-methyl-2-pentyl) phosphorodithioate in mineral oil there was added at 80–90° C. 58 grams (1.0 equivalent) of propylene oxide. The addition was effected throughout a period of three hours and the resulting mixture was heated to a final temperature of 85° C./10 mm. The light brown residue showed the following analyses:

Percent phosphorus _____ 7.2
Percent sulfur _____ 15.1
Percent cadmium _____ 13.1

*Example 10*

To 774 grams (1.0 equivalent) of a 60% solution of zinc O,O-di(sec-amylphenyl) phosphorodithioate in mineral oil, there was added portionwise throughout a period of three hours, 58 grams (1.0 equivalent) of propylene oxide. The exothermic nature of the resulting reaction allowed control of the temperature within the range of 30–55° C. When all the propylene oxide had been added, the mixture was heated rapidly to 80° C. and held at that temperature for ten minutes. The mixture was then concentrated by heating at 80° C./25 mm. for thirty minutes. The residue was a clear orange liquid with the following analyses:

Percent sulfur _____ 7.9
Percent phosphorus _____ 3.8
Percent zinc _____ 3.9

*Example 11*

To 390 grams (1.0 equivalent) of a 77% solution in mineral oil of the zinc salt of the reaction product of 1.0 mole of phosphorus pentasulfide and 4.0 moles of mixed isopropyl and 4-methyl-2-pentyl alcohols, there was added at 80° C., 120 grams (1.0 equivalent) of styrene oxide. The addition of styrene oxide was made portionwise over a period of three hours and a temperature of 100° C. was maintained for an additional thirty minutes. Thirty grams of unchanged styrene oxide was obtained by distillation from the reaction mixture at a final temperature of 100° C./20 mm. The residue was a clear, slightly viscous liquid.

*Example 12*

To 321 grams (0.5 equivalent) of zinc O,O-di-(nonylphenoxyethyl) phosphorodithioate at 80° C., there was added 29 grams (0.5 equivalent) of propylene oxide. The propylene oxide was added at a rate sufficient to maintain the reaction temperature at 85° C. This temperature was maintained for an additional hour and then the reaction mixture was filtered through Hyflo. The filtrate showed the following analyses:

Percent phosphorus _____ 4.2
Percent sulfur _____ 8.7
Percent zinc _____ 4.8

*Example 13*

A mixture of 440 grams (1.26 equivalents) of di-(propylphenyl) phosphinodithioic acid and 500 grams of hydrogenated terphenyl (as an inert solvent) was heated with stirring to 95° C., and treated first with 10 grams of water and then with 52 grams (0.63 mole) of zinc oxide. The zinc oxide was added portionwise over a period of 20 minutes, and the temperature was maintained at 85–90° C. for an additional hour. The solvent then was removed by distillation at reduced pressure leaving as a residue the zinc salt of the above acid.

To this salt there was added with stirring at 67–73° C., 81 grams (1.39 equivalents) of propylene oxide; the addition was made over a period of 35 minutes. The resulting mixture was heated at 68–100° C. for 30 minutes and then filtered through Hyflo. The filtrate was a yellowish-brown liquid having the following analyses:

Percent phosphorus _____ 3.7
Percent sulfur _____ 5.4
Percent zinc _____ 2.9

*Example 14*

A solution of 497 grams (2.0 equivalents) of the zinc salt of diisopropyl phosphorodithioic acid in 497 grams of benzene was heated at reflux temperature while 144 grams (2.0 equivalents) of butylene oxide was added dropwise over a period of two hours. The benzene was removed by distillation under reduced pressure and the residue filtered through Hyflo. The light yellow, viscous filtrate showed the following analyses:

Percent phosphorus _____ 9.3
Percent sulfur _____ 21.0
Percent zinc _____ 10.8

*Example 15*

To 228 grams (0.58 equivalent) of a 77% solution in mineral oil of a mixture of the zinc salts of di(4-methyl-2-pentyl) phosphorodithioic acid and diisopropyl phosphorodithioic acid there was added at 80–100° C., 75 grams (0.58 equivalent) of octylene oxide. The addition was made dropwise over a period of four hours. The mixture was stirred at 100° C. for another 30 minutes and then filtered. The filtrate showed the following analyses:

Percent phosphorus _____ 6.8
Percent sulfur _____ 14.2
Percent zinc _____ 7.3

*Example 16*

Fifty-eight grams (1.0 equivalent) of propylene oxide was added portionwise with stirring to 660 grams (1.0 equivalent) of 54% solution of zince di-(4-methyl-2-pentyl) phosphoromonothioate in mineral oil. The addition required two hours and the temperature was maintained at 30–55° C. throughout this period. Thereafter, the temperature was raised to 80° C. and held there for 30 minutes before filtering. The filtrate was a clear, orange liquid with the following analyses:

Percent phosphorus _____ 4.6
Percent sulfur _____ 4.9
Percent zinc _____ 6.0

The metal-containing products described herein are particularly suitable for use in lubricants. Such lubricants include not only free-flowing compositions used in the lubrication of the moving parts of internal combustion engines, but also the more viscous lubricants employed in the protection of the gear surfaces of differential housings. In the former case i.e., crankcase lubricants, the metal-containing products of this invention serve to inhibit the corrosion of the metal surfaces and are effective for this purpose in concentrations of the order of 0.1–2.0 percent. A particularly effective crankcase lubricant may be prepared by the incorporation into a mineral oil base of 0.5 percent of the metal-containing product as described herein, together with minor amounts of a detergent, such as for example an alkaline earth metal sulfonate.

When used in gear lubricants, it is preferred to use higher concentrations of the metal-containing product described herein; concentrations of the order of 3.5–10 percent are most effective and a typically satisfactory gear lubricant is illustrated by a mineral oil solution of 5.0 percent of the product of Example 5. These products impart to the gear lubricant highly desirable anti-rust properties as well as a measure of protection from extreme pressure. Such gear lubricants should contain, for optimum results, additional constituents such as organic polysulfides, anti-foam agents, etc.

Other applications in which the products of this invention are useful include asphalt emulsions in which these products serve as oxidation inhibitors. Such asphalt emulsions are used in the preparation of built-up roof surfaces. Still further uses for the compositions of this invention include their incorporation into insecticidal compositions, fire-proofing agents in plasticizers and plastics, paint driers, rust-inhibiting compositions, pesticides, foaming compositions, cutting oil, metal drawing compositions, flushing oils, textile treatment compositions, tanning compositions, metal cleaning compositions, emulsifying agents, etc.

Other modes of applying the principle of the invention may be employed, change being made as regards the details described, provided the features stated in any of the following claims, or the equivalent of such, be employed.

We therefore particularly point out and distinctly claim as our invention:

1. The process of preparing phosphorus- and sulfur-containing compositions which comprises the reaction of a metal salt of a phosphorothioic acid having the structure

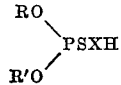

where R and R' are organic radicals selected from the class consisting of alkyl, cycloalkyl, aryl, aralkyl, alkaryl, alkenyl, and cycloalkenyl radicals, and where X is selected from the class consisting of oxygen and sulfur, with at least a substantially equivalent amount of an organic compound selected from the class consisting of epoxy alkanes, epoxy lower alkenes, epoxy alkyl carboxylic acids, styrene oxide, epichlorohydrin and thioepoxy lower alkanes, the metal of said metal salt being selected from the class consisting of sodium, lithium, potassium, calcium, barium, strontium, magnesium, aluminum, lead, cadmium, zinc and molybdenum.

2. The process of claim 1 characterized further in that R and R' of the phosphorothioic acid are saturated hydrocarbon radicals.

3. The process of claim 1 characterized further in that the phosphorothioic acid is a phosphorodithioic acid.

4. The process of claim 1 characterized further in that R and R' of the phosphorothioic acid are alkyl radicals.

5. The process of claim 1 characterized further in that the second-named reactant is an epoxy alkane.

6. The process of claim 1 characterized further in that the metal salt is a salt of a polyvalent metal.

7. The process of preparing phosphorus- and sulfur-containing compositions which comprises the reaction of a metal salt of a phosphorodithioic acid having the structure

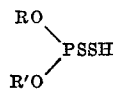

where R and R' are alkyl radicals with at least a substantially equivalent amount of an epoxy alkane, the metal of the said metal salt being selected from the class consisting of sodium, lithium, potassium, calcium, barium, strontium, magnesium, aluminum, lead, cadmium, zinc and molybdenum.

8. The process of claim 7 characterized further in that the epoxy alkane is propylene oxide.

9. The process of claim 1 characterized further in that the metal salt is a zinc salt.

10. The product obtained by the process of claim 1.

11. The product obtained by the process of claim 7.

12. The process of preparing phosphorus- and sulfur-containing compositions which comprises the reaction of a metal salt of a phosphorus thioic acid in which the organic radicals are hydrocarbon radicals, said phosphorus thioic acid selected from the class consisting of phosphoromonothioic acids, phosphorodithioic acids and phosphinodithioic acids with at least a substantially equivalent amount of an organic compound selected from the class consisting of epoxy alkanes, epoxy lower alkanes, epoxy alkyl carboxylic acids, styrene oxide, epichlorohydrin and thioepoxy lower alkanes, the metal of said metal salt being selected from the class consisting of sodium, lithium, potassium, calcium, barium, strontium, magnesium, aluminum, lead, cadmium, zinc and molybdenum.

References Cited in the file of this patent

UNITED STATES PATENTS

| | | |
|---|---|---|
| 1,949,629 | Romieux et al. | Mar. 6, 1934 |
| 2,494,284 | Cassaday et al. | Jan. 10, 1950 |
| 2,760,937 | McDermott | Aug. 28, 1956 |
| 2,783,202 | McDermott | Feb. 25, 1957 |

OTHER REFERENCES

Kabachnik: "Zhur Obsechei Khim," 25, 2274–7 (1955).
Elderfield: Heterocyclic Compounds, vol. I (1950), pp. 22, 23, and 25.

---

Notice of Adverse Decision in Interference

In Interference No. 92,599 involving Patent No. 3,004,996, A. N. Arakelian, A. Rhodes and T. R. Hopkins, PHOSPHORUS AND SULFUR CONTAINING COMPOSITIONS AND METHOD FOR PREPARING SAME, final judgment adverse to the patentees was rendered Apr. 13, 1965, as to claims 1, 2, 3, 4, 5, 6, 7, 8, 9, 10, 11 and 12.

[*Official Gazette December 14, 1965.*]

Notice of Adverse Decision in Interference

In Interference No. 92,599 involving Patent No. 3,004,996, A. N. Arakelian, A. Rhodes and T. R. Hopkins, PHOSPHORUS AND SULFUR CONTAINING COMPOSITIONS AND METHOD FOR PREPARING SAME, final judgment adverse to the patentees was rendered Apr. 13, 1965, as to claims 1, 2, 3, 4, 5, 6, 7, 8, 9, 10, 11 and 12.

[*Official Gazette December 14, 1965.*]